(12) United States Patent
Derscheid et al.

(10) Patent No.: US 9,791,863 B2
(45) Date of Patent: Oct. 17, 2017

(54) LOCATION-BASED MATERIAL GATHERING

(71) Applicant: Deere & Company, Moline, IL (US)

(72) Inventors: Daniel E. Derscheid, Hedrick, IA (US); Jacob D. Kappelman, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 94 days.

(21) Appl. No.: 14/076,992

(22) Filed: Nov. 11, 2013

(65) Prior Publication Data

US 2015/0134175 A1 May 14, 2015

(51) Int. Cl.

| | |
|---|---|
| *G01C 22/00* | (2006.01) |
| *G05D 1/00* | (2006.01) |
| *G05D 1/02* | (2006.01) |
| *A01F 15/08* | (2006.01) |
| *A01D 41/14* | (2006.01) |
| *A01D 41/127* | (2006.01) |
| *A01D 46/08* | (2006.01) |
| *A01D 63/00* | (2006.01) |
| *A01D 65/00* | (2006.01) |
| *A01D 39/00* | (2006.01) |
| *A01D 75/28* | (2006.01) |
| *A01D 57/00* | (2006.01) |

(52) U.S. Cl.
CPC .............. *G05D 1/021* (2013.01); *A01F 15/08* (2013.01); *A01F 15/0825* (2013.01); *A01F 15/0833* (2013.01); *G05D 1/0278* (2013.01); *A01D 39/00* (2013.01); *A01D 57/00* (2013.01); *A01D 75/28* (2013.01); *G05D 2201/0201* (2013.01)

(58) Field of Classification Search
CPC . G05D 1/00; B62D 6/00; A01D 75/28; A01D 39/00; A01D 57/00
USPC ...................... 701/25, 23; 56/10.2, 13.5, 341
See application file for complete search history.

(56) References Cited

U.S. PATENT DOCUMENTS

| | | | |
|---|---|---|---|
| 6,421,990 B1 * | 7/2002 | Ohlemeyer et al. | ........ 56/10.2 R |
| 7,296,393 B1 * | 11/2007 | McClure | ............... A01F 15/106 56/341 |
| 2010/0146924 A1 * | 6/2010 | Peden | .................... A01D 57/12 56/341 |
| 2010/0318253 A1 * | 12/2010 | Brubaker et al. | ............... 701/25 |

(Continued)

FOREIGN PATENT DOCUMENTS

EP    2036426 A1    3/2009

OTHER PUBLICATIONS

European Search Report issued in counterpart application No. 14191871.4, dated Mar. 25, 2015 (8 pages).

(Continued)

*Primary Examiner* — Mahmoud Ismail

(57) ABSTRACT

A computer-implemented method and control system for gathering material is described. One or more vehicles may include an intake mechanism for material and a location-tracking system. A current orientation of the intake mechanism is identified based upon location information from the tracking system. A current orientation of the material is determined based upon historical location information for the material. A target orientation of the intake mechanisms is determined based upon the current orientation of the material. Movement of the intake mechanism is thus directed toward the determined target orientation.

20 Claims, 5 Drawing Sheets

(56) References Cited

U.S. PATENT DOCUMENTS

2012/0265392 A1 10/2012 Brubaker et al.
2013/0074465 A1* 3/2013 Ardison ............... A01D 67/005
56/13.5

OTHER PUBLICATIONS

Ming, Li et al. Localization System Based on Artificial Landmark and Omnidirectional Vision. International Conference on Information Engineering and Computer Science, Dec. 2009, pp. 1-4, [online], [retrieved on Jun. 3, 2015]. Retrieved from the Internet <URL: http://ieeexplore.ieee.org/xpls/abs_all.jsp?arnumber=5365330&tag=1> <DOI: 10.1109/ICIECS.2009.5365330>.

* cited by examiner

LOCATION-BASED MATERIAL GATHERING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to control of the gathering of material, including the control of baling operations for various hay, foraging and other equipment.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may be utilized to gather such material. For example, a baler (e.g., a round baler) may be pulled by a tractor along a material windrow and may pick up the cut material from the windrow for formation into a bale. Likewise, other equipment may be utilized to pick up and/or rearrange windrow material for various purposes.

Due to various factors, windrows may not be uniformly shaped or oriented. For example, windrows may exhibit varying widths depending on factors including characteristics of the windrow material and of the equipment used for raking or cutting of the material. Similarly, a windrow may not necessarily follow a straight line across a field. Rather, the center of a particular windrow may meander in various ways (e.g., depending on the path of travel of equipment used for raking or cutting). Finally, even for skilled operators or vision systems, it may be difficult to distinguish the boundaries of a windrow from the underlying ground and plant material.

SUMMARY OF THE DISCLOSURE

A system and computer-implemented method are disclosed for controlling material-gathering operations, such as baling.

According to one aspect of the disclosure, a computer-implemented method includes determining a current orientation of an intake mechanism for material gathering based upon location information determined by a location-tracking system. The method also includes determining a current orientation of the material to be gathered based upon historical location information for the material. The method further includes determining a target orientation of the intake mechanism based upon the determined current orientation of the material and directing a movement of the intake mechanism toward the target orientation.

One or more of the following features may be included in the disclosed material gathering method. In particular, the method may be implemented with respect to a tractor and a baler, wherein the intake mechanism is included in the baler and the method directs movement of the intake mechanism by directing movement of the tractor or the baler. Determining the target orientation of the intake mechanisms may be further based on information from bale-shape sensors within a baling chamber of the baler. The location-tracking system may include a global positioning system device or a real-time landmark tracker. Historical location information for the material may be determined based upon the location-tracking system. The material may be formed into windrows, wherein determining the current orientation of the material may include identifying centerlines of the windrows and directing movement of the intake mechanism may include directing the intake mechanism along paths that are locally parallel to the centerlines or directing various weaving operations with respect to the centerlines.

According to another aspect of the disclosure, a system for gathering material includes one or more vehicles having an intake mechanism for the material, and a location-tracking system movable with the one or more vehicles and capable of determining location information for the one or more vehicles and the intake mechanism. The system includes one or more processor devices coupled with one or more memory architectures. The processor devices are configured to determine a current orientation of an intake mechanism for material gathering based upon location information determined by a location-tracking system and to determine a current orientation of the material to be gathered based upon historical location information for the material. The processor devices are configured to determine a target orientation of the intake mechanism based upon the determined current orientation of the material and to direct a movement of the intake mechanism toward the target orientation.

One or more of the following features may be included in the disclosed material gathering control system. In particular, the one or more vehicles may include a tractor and a baler, wherein the intake mechanism is included in the baler and the processor devices are configured to direct movement of the intake mechanism by directing movement of the tractor or the baler. Determining the target orientation of the intake mechanisms may be further based on information from bale-shape sensors within a baling chamber of the baler. The location-tracking system may include a global positioning system device or a real-time landmark tracker. Historical location information for the material may be determined based upon the location-tracking system. The material may be formed into windrows, wherein determining the current orientation of the material may include identifying centerlines of the windrows and directing movement of the intake mechanism may include directing the intake mechanism along the paths that are locally parallel to the centerlines or directing various weaving operations with respect to the centerlines.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference numerals in the drawings indicate like components, parts, or operations.

DETAILED DESCRIPTION

Figure 1:
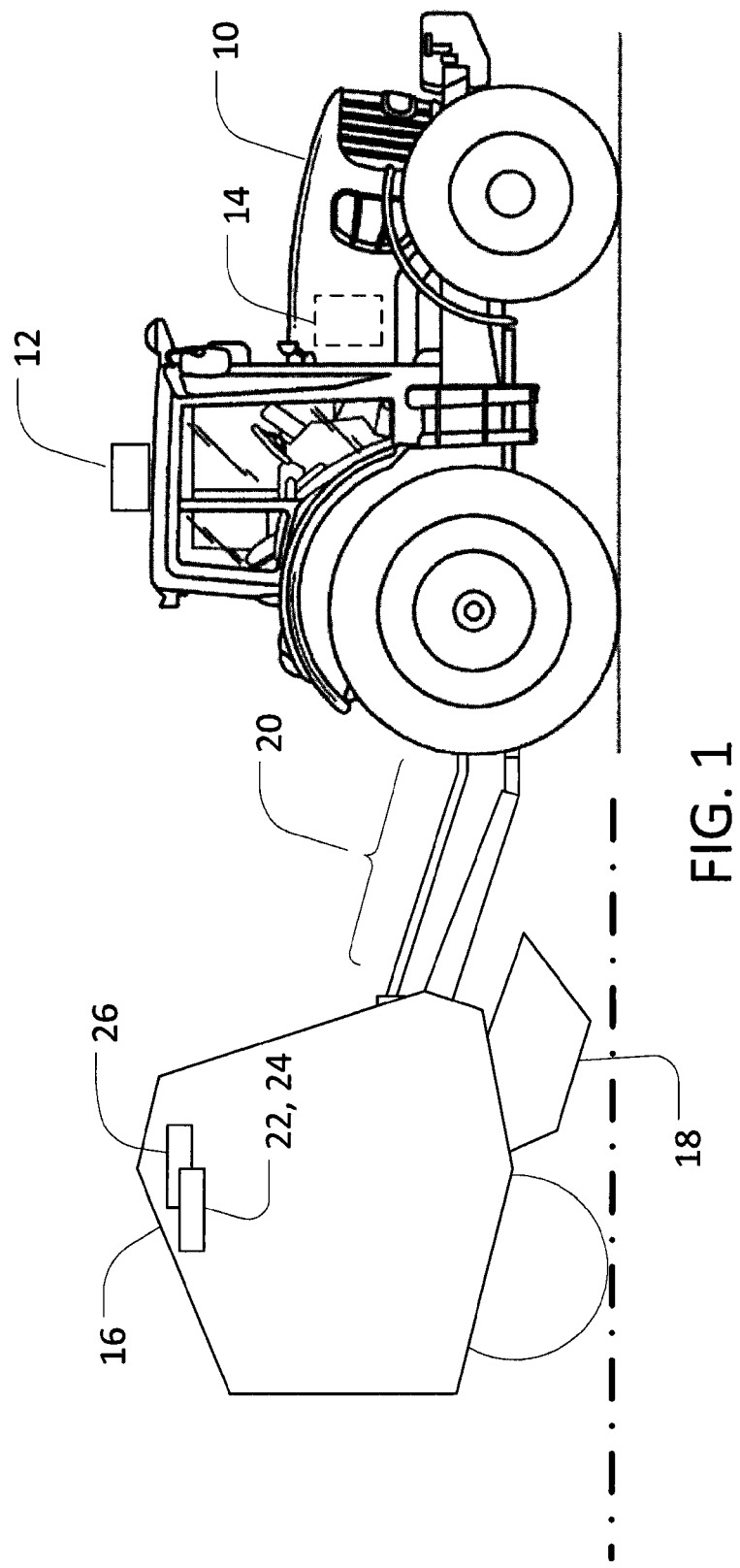
FIG. 1 is a side view of an example work vehicle and baler with which a system and method for controlling baling operations may be implemented.

The following describes one or more example implementations of the disclosed system and method, as shown in the accompanying figures of the drawings described briefly above.

As also discussed above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales (or for other purpose). In baling (and other operations), however, it may be difficult to appropriately orient a material gathering mechanism with respect to the material that is to be collected. For example, windrows may meander to varying degrees, thereby increasing the difficulty of manually tracking the windrows with a gathering device (e.g., a baler). Also, optical characteristics (e.g., color, surface characteristics, and so on) of material to be gathered (e.g., as arranged in a windrow) and the underlying ground or vegetation may be highly similar. This may make it difficult for operators to distinguish the material from the field and thereby increase the difficulty of correctly orienting a gathering mechanism. Various other problems may also arise.

Use of the disclosed location-based material gathering ("LBG") system and method may address these and various other issues. For example, an LBG system (or method) may utilize location-tracking devices, such as global positioning system ("GPS") devices, to determine the orientation of both material to be gathered and one or more mechanisms to be used to implement the gathering. An LBG system (or method) may then utilize this orientation information to direct movement of the gathering mechanism(s), including movement parallel to a local orientation of the material and various weaving movements (i.e., movements causing the gathering mechanism to deviate from a current path of travel). As such, among other benefits, an LBG system (or method) may facilitate more efficient gathering of cut material, more uniform formation of material bundles (e.g., bales), and otherwise improve material-gathering operations.

In one embodiment, for example, a combine equipped with a GPS tracker may harvest a grain field, leaving behind windrows of cut waste straw. The various locations of the combine during the harvesting (as determined by the GPS tracker) may be recorded and stored. In a later baling operation, a tractor equipped with a GPS tracker may tow a baler through the same field to bale the straw from the windrows. The baler may be configured as a fixed-axle trailer secured by a clevis fastener to the tractor. The historical location information gathered during the harvesting, which may indicate the current orientation of the various windrows (e.g., the path of the centerlines of the windrows), may be provided to a controller on the tractor. When combined with current location and trajectory information for the tractor (e.g., as derived from measurements by the GPS tracker), this historical location information may be utilized by the controller to direct the path of the baler (e.g., by directing the path of the tractor, which tows the baler). In this way, both historical and current location information may be utilized in combination to improve the efficiency, accuracy, and general quality of the baling operation. In certain embodiments, information from bale-shape sensors (e.g., sensors located within the baling chamber of the baler) may be additionally used to determine an optimal path on which to direct the baler.

Although various examples herein may discuss the use of an LBG system (or method) with respect to a baling operation, it will be understood that the principles of an LBG system (or method) may be usefully applied to various other operations as well, including various other material-gathering operations. Further, it will be understood that various equipment may be utilized with an LBG system (or method) other than the equipment presented in the examples herein, including for baling or other operations.

Referring now to FIG. 1, an LBG system and method may be implemented with respect to a variety of vehicles (or other platforms), including, for example, work vehicle 10 and baler 16. Work vehicle 10, depicted here as a tractor, may include location-tracking device 12, which may include a GPS device, an optical or other camera-based system, or another system configured to identify a real-time location of vehicle 10 or baler 16. Work vehicle 10 may further include baling control unit 14, which may form part of a larger control unit (e.g., a transmission control unit) or may be a stand-alone control unit. Baling control unit 14 may be configured to exchange signals with location-tracking device 12 or various other sensors, actuators, or electronics (not shown). For example, baling control unit 14 may communicate with various other devices via a CAN bus or ISO bus of vehicle 10 (not shown).

Baler 16 may be a baling device of various known configurations. Generally, it will be understood that a baler may be a device configured to retrieve cut material from an environment (e.g., to collect hay from various windrows in a field) and create round (or other) bales of the material. Baler 16 may include pick-up mechanism 18, which may be configured to route cut plant material (e.g., hay) from windrows along the path of baler 16 into the interior of baler 16 for formation into a bale. Pick-up mechanism 18 may include a feed opening, as well as various baffles, augers, rotors, and so on for directing crop materials from windrows into the baling chamber. In certain embodiments, pick-up mechanism 18 may be wider than a baling mechanism (not shown) included in a baling chamber of baler 16. As such, pick-up mechanism 18 may extend wider than the width of a formed bale (not shown) in baler 16, sometimes by 30% or more of the bale width. Accordingly, pick-up mechanism 18 may route some cut material inward from the outer edges of pick-up mechanism 18 for inclusion in the formed bale.

In certain embodiments, baler 16 may include various sensors for measuring aspects of bale formation. For example, baler 16 may include one or more bale-shape sensors, such as left-side shape sensor 22, right-side shape sensor 24, and centerline shape sensor 26 (As used herein, left and right will be described from the perspective of the forward path of travel of a tractor, baler, or other relevant machine). Sensors 22, 24 and 26 may utilize various known means for bale shape (or size) sensing, such as sensing of belt-tension or crop flow rates. Further, sensors 22, 24 and 26 (or other) may be located at various points within baler 16. Such sensors may be utilized to measure various bale shape characteristics, including the size of various portions of a bale (e.g., the local radius of a cylindrical bale). In certain embodiments, as discussed in greater detail below, bale shape information from sensors 22, 24, and 26 (or various other sensors), may be utilized, at least in part, to control baling operations. (In non-baling operation, similar sensors may also be useful. For example, crop flow sensors (or others) may be utilized to measure various aspects of the gathering of material from a windrow (or other material source), thereby facilitating appropriate adjustment of a pick-up mechanism (e.g., through appropriate adjustment of the path of an associated vehicle)).

Connections 20 may extend between baler 16 and vehicle 10. Certain of connections 20 may be mechanical connections for transmission of mechanical force or power between vehicle 10 and baler 16. For example, connections 20 may include a tongue for towing baler 16 behind vehicle 10. Connections 20 may also include a power take-off ("PTO") shaft for transmission of rotational mechanical power (or other power) between vehicle 10 and baler 16. In certain embodiments, connections 20 may include signal-carrying connections for transmission of various control signals (and related inputs) between baler 16 and vehicle 10. As such, for example, signal conduits included within connections 20 may communicate with an ISO bus or CAN bus on vehicle 10. It will be understood that various other known means, such as wireless communication devices, may additionally (or alternatively) be employed to transmit control (and other) signals between baler 16 and vehicle 10.

In certain embodiments, based on GPS information (or other location information), an LBG system (or method) may determine the orientation of a vehicle (e.g., vehicle 10 or baler 16) or an associated material intake (e.g., intake mechanism 18). As used herein, "orientation" may refer to the location of an object (e.g., a vehicle or baler), a direction the object is facing, various profiles or contours defined by the object's location, geometry or travel path (e.g., a centerline defined by a windrow's geometry or a vehicle's path of travel), or a projected direction of travel of an object (e.g., a vehicle or baler). For example, an LBG system (or method) may utilize GPS (or other location) information to determine where in a field vehicle 10 (or baler 16) is located, the direction vehicle 10 (or baler 16) is facing, or a current path of travel of vehicle 10 (or baler 16).

Likewise, an LBG system (or method) may determine the orientation of a windrow. For example, an LBG system (or method) may utilize GPS information to determine the profile of a centerline of a windrow (i.e., the path followed by the windrow centerline over a portion of a field). To do this, for example, a GPS device (e.g., device 12) may be utilized to record location information during a prior cutting or raking operation (e.g., location information of a cutting or raking vehicle, which may indicate the location of a resulting windrow). This location information may then be accessed by an LBG system (or method) during a current material-gathering (e.g., baling) operation in order to determine the location of a windrow of material to be gathered (e.g., the centerline of the windrow).

An LBG system (or method) may also determine other information relating to the orientation of vehicle 10 (or baler 16), including information from sensors or devices other than location-tracking device 12. For example, an LBG system (or method) may utilize various wheel or other sensors (not shown) in order to determine the degree to which various wheels of vehicle 10 (or baler 16) are turned, various shaft sensors to determine vehicle speeds, and so on. This information, along with location information, may then be utilized to determine various orientation information, such as a projected path of travel for vehicle 10 (or baler 16).

If the same vehicle (e.g., vehicle 10) is utilized for both a cutting or raking operation and a material-gathering operation, a single location-tracking system (e.g., GPS device 12) may be utilized to measure location information during each operation. This location information—historical information from the cutting or raking and current information from the material-gathering—may then be utilized to determine the orientation of the vehicle (and others, such as a towed baler) and of various windrows, and thereby to guide the material-gathering operation. Alternatively, for example, if one vehicle is utilized for the cutting or raking, and a different vehicle is utilized for the material-gathering, location information may be collected by two location-tracking devices (e.g., a GPS device on each vehicle). Historical location information (or other information that is derivative therefrom) may then be provided from the vehicle's cutting or raking tracking system to the vehicle's material-gathering tracking system, so that the material-gathering operation may be appropriately controlled.

Figure 2:
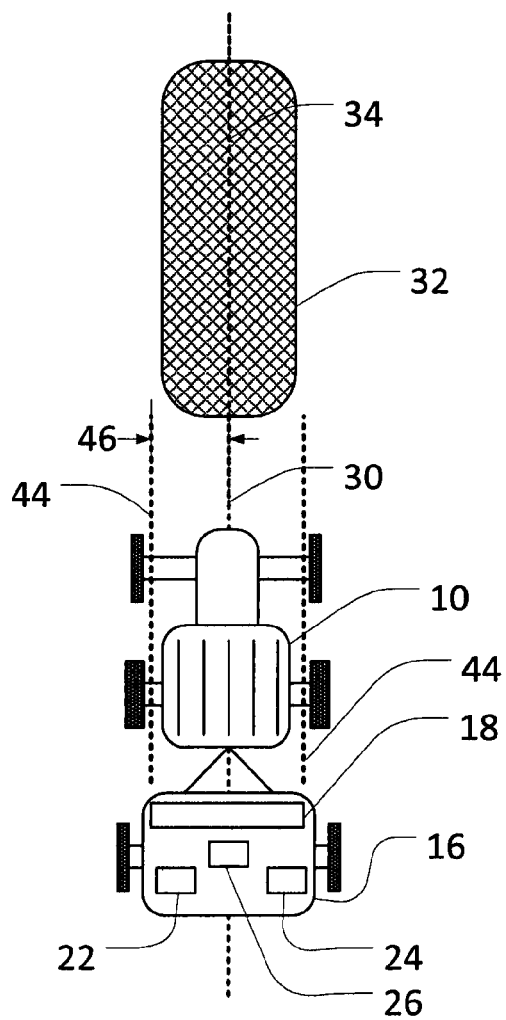
FIG. 2 is a schematic view of a baling operation for the work vehicle and baler of FIG. 1, with a centered windrow.

Referring now to FIG. 2, vehicle 10 may be generally traveling along path of travel 30 (e.g., as determined using GPS information), which may extend through the centerline of vehicle 10 and baler 16. In certain instances, windrow 32 may extend to roughly the width of baler 16 (or pick-up mechanism 18), with a windrow centerline 34 that is substantially co-linear with path of travel 30 of vehicle 10 (and baler 16). Accordingly, as vehicle 10 (and baler 16) travel along path of travel 30 over windrow 32, a bale of relatively uniform cross-section may be formed within baler 16 (e.g., as detected by bale-shape sensors 22, 24 and 26). This may be represented schematically as uniform bale cross-section A. In such a case, while windrow 32 remains appropriately centered with respect to baler 16 and a bale is being uniformly formed, an LBG system (or method) may direct vehicle 10 (or baler 16) not to deviate from path 30. For example, an LBG system may determine, based on sensors 22, 24, and 40, that a bale is being formed uniformly and may determine, based on historical and current GPS information, that the path of travel of baler 16 is substantially co-linear with a centerline of windrow 32. Accordingly, a LBG system (or method) may determine that a continued course for baler 16 (and vehicle 10) along path 30 (and centerline 34 of windrow 32) may be appropriate.

Figure 3:
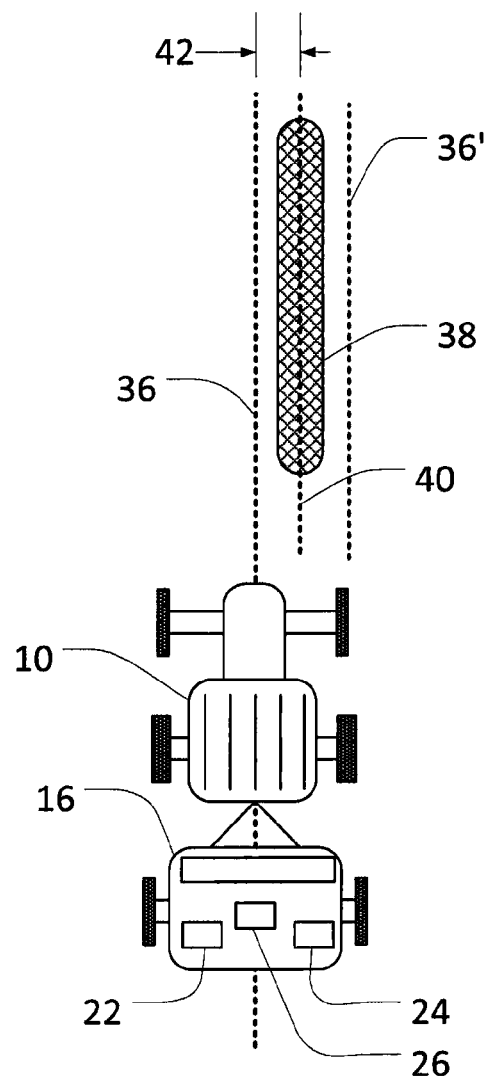
FIG. 3 is a schematic view of a baling operation for the work vehicle and baler of FIG. 1, with an off-center windrow.

Due to various factors, however, a window centerline (or other feature) may not be always co-linear with a current path of travel of vehicle 10 and baler 16. For example, referring now to FIG. 3, vehicle 10 (and baler 16) may be traveling along path of travel 36 (e.g., as determined by an LBG system (or method) based upon GPS information from device 12). Based upon GPS information recorded during a prior cutting operation (e.g., a cutting operation that created windrow 38), an LBG system (or method) may determine that path of travel 36 is offset from centerline 40 of windrow 38. Accordingly, if vehicle 10 continues along path of travel 30, baler 16 may form an uneven bale. This may be represented schematically as non-uniform bale cross-section B.

Accordingly, in order to better distribute the crop material of windrow 38 in baler 16, an LBG system (or method) may direct various adjustments to the path of vehicle 10 (or baler 16) that appropriately orient pick-up mechanism 18 with respect to windrow 38. For example, based on GPS information (as above) or location information from another location-tracking system, the LBG system (or method) may determine that a particular offset 42 separates projected path of travel 36 from centerline 40 of windrow 38. Accordingly, the LBG system (or method) may cause the vehicle 10 (or baler 16) to deviate from path 36 in the direction of centerline 40 (i.e., to weave to the right from path 36 toward windrow 38). For example, vehicle 10 may be directed to weave to the right from current path of travel 36 and adopt a new path of travel 36' that is parallel to centerline 40, but offset to the right by the same absolute distance as offset 42.

As the baling operation continues, an LBG system (or method) may continue to adjust the path of travel of vehicle 10 (and baler 16) as appropriate. For example, based in part on bale size information (e.g., from sensors 22, 24, and 26) an LBG system (or method) may direct various periods of weaving travel interspersed with various periods of steady forward travel (including both centered and offset travel, with respect to a windrow centerline). For example, if bale sensors 22 and 24 detect formation of a bale with cross-section B in FIG. 3, an LBG system (or method) may direct vehicle 10 (as above) to weave to the right and then temporarily hold a path of travel parallel to centerline 40, but offset to the right therefrom (e.g., path of travel 36'). This may shift to the left the uptake of material from windrow 38 into baler 16 and, accordingly, cause the size of the left side of the bale (as seen in bale cross-section B) to catch up to the size of the right side of the bale.

Once the bale is more evenly formed (as determined, for example, based upon sensors 22, 24, and 26), a more symmetrical (or other new) path of travel may then be commanded. For example, an LBG system (or method) may direct vehicle 10 to generally follow centerline 40 of windrow 38, to proceed parallel to centerline 40, but on alternating sides thereof and with various offsets therefrom (as informed, for example, by measurements by sensors 22 and 24), and so on. For example, based on GPS information an LBG system (or method) may direct vehicle 10 to weave between paths of travel 36 and 36', with the timing of weaving operations between paths 36 and 36' and the length of time of the various periods of straight travel along paths 36 and 36' determined based upon bale-shape sensor information (as well as GPS information). In this way, for example, as vehicle 10 and baler 16 advance across the field, crop material from windrow 38 may be picked up (over time) across an appropriately wide portion of pick-up mechanism 18 and thereby (or otherwise) appropriately distributed across the width of a bale being formed by baler 16. As such, an LBG system (or method) may facilitate more complete pick-up of windrow material and formation of more even bales.

In certain embodiments, an LBG system (or method) may take into account various other information relating to vehicle 10, baler 16 and a windrow (e.g., windrow 32) in determining an appropriate path of travel for vehicle 10 (or baler 16). For example, referring back to FIG. 2, an LBG system (or method) may identify a maximum offset between a path of travel of vehicle 10 (or baler 16) and a centerline (or another feature) of a windrow. In certain embodiments, this may usefully ensure that the outer edges of a windrow do not extend beyond the outer range of pick-up mechanism 18 and that minimal windrow material is left in the field. For example, offset 46 may represent the distance between the outer reach of pick-up mechanism 18 (represented by lines 44), and the centerline of baler 16 (e.g., as determined from known dimensions of baler 16). Using this information, an LBG system (or method) may direct vehicle 10 (and baler 16) along a path of travel such that the material of windrow 32 is always within the pick-up range of pick-up mechanism 18. For example, an LBG system (or method) may direct vehicle 10 such that an outer edge of windrow 32 (e.g., as identified based upon windrow width and windrow centerline information) is never more than offset 46 away from a centerline of baler 16. In this way, while providing for more evenly formed bales, an LBG system (or method) may also reduce the amount of crop material left behind in a field, due to portions of windrow 32 extending beyond the reach of pick-up mechanism 18.

To support this (and other) functionality, an LBG system (or method) may receive various inputs relating to the width of a windrow. For example, when a raking or cutting operation is executed (or afterwards), windrow width information may be determined and, if appropriate, stored for later access by an LBG system (or method). In certain implementations, one or more windrow widths may be determined by an LBG system (or method) based upon the nature of the cut material, the dimensions or settings of a cutting or raking machine, the particulars of the execution of a cutting or raking operation, and so on. For example, various operational settings for a cutting or raking device during a particular cutting or raking operation may be utilized to determine an average windrow width that may result from that particular operation. Alternatively (or additionally), a windrow width may be otherwise determined (e.g., via operator input, various look-up tables, and so on). In certain embodiments, for example, windrow width information may be determined based upon settings of one or more swathboards or rakes used in a prior operation. For example, a user may input information regarding such settings (or actual windrow width information, as determined based upon those settings) into an LBG system (or method).

Figures 4, 5:
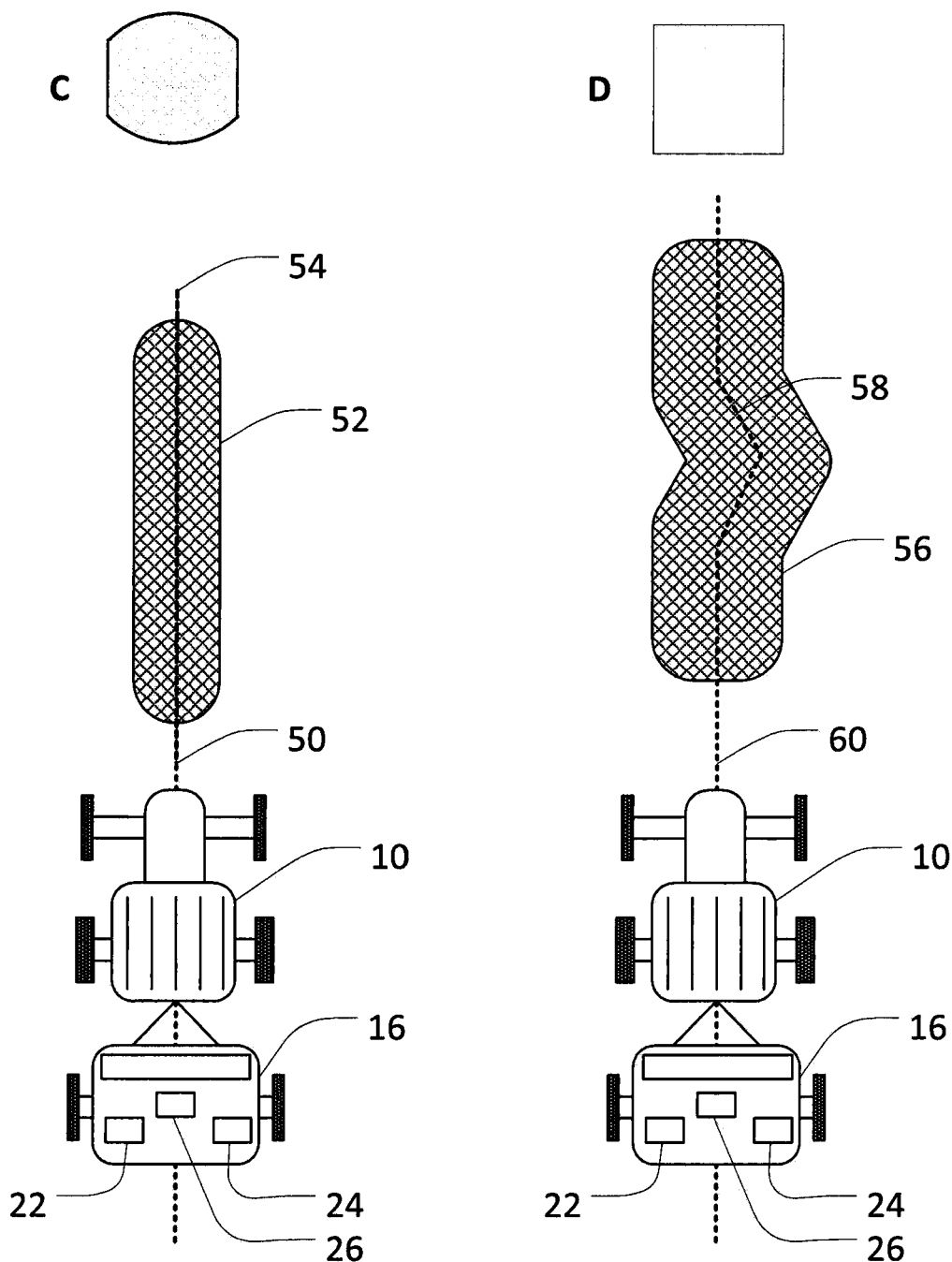
FIG. 4 is a schematic view of a baling operation for the work vehicle and baler of FIG. 1, with a narrow windrow.
FIG. 5 is a schematic view of a baling operation for the work vehicle and baler of FIG. 1, with a meandering windrow

As depicted in FIG. 4, in another example of directing a baling operation with an LBG system (or method), centerline 54 of windrow 52 may be centered along path of travel 50 of vehicle 10 (and baler 16), but the width of windrow 52 may not extend across the full width of a bale being formed in baler 16 (or the full width of pick-up mechanism 18). As such, absent changes in path of travel 50, a bale formed by baler 16 may be barrel shaped (i.e., may bulge in the center and taper off to either side), as represented by bale cross-section C. In such a case, for example, side sensors 22 and 24 may indicate roughly equal bale size on either side of baler 16. Sensor 26, however, may indicate that the center portion of the bale (as measured by sensor 26) is thicker than side portions of the bale (as measured by sensors 22 and 24). In other words, a combination of information from sensors 22, 24 and 26 may indicate that bale formation at the center of baler 16 is proceeding at a faster pace than bale formation at the sides of baler 16. Accordingly, in order to produce a more evenly shaped bale, an LBG system (or method) may direct vehicle 10 (and baler 16) to weave alternately to either side of path of travel 50, thereby providing more crop material from windrow 52 to the side portions of baler 16. As also noted above, this weaving may sometimes be interspersed with periods of straight travel at various offsets from centerline 54 of windrow 52 (including zero offset, at certain times), thereby allowing crop material to appropriately accumulate on distributed portions of the relevant bale. In various cases, such weaving may be required for any windrow that is not as wide as pick-up mechanism 18 or a bale to be formed by baler 16.

In certain implementations, the use of a particular type of pick-up mechanism 18 that is wider than a baling chamber of baler 16 may be particularly useful. For example, based upon having identified a centerline of a windrow and a width of the windrow that is less than the width of the baling chamber (or other relevant width associated with baler 16), an LBG system (or method) may direct the travel of baler 16 such that significant amounts of material enters baler 16 from the sides of pick-up mechanism 18. In this way, because pick-up mechanism 18 may extend beyond the width of the formed bale, material may be crowded at the sides of the bale, thereby reducing the likelihood of forming (or improving the rate of correction for) a barrel-shaped (or other sub-optimal) bale. Further, if pick-up mechanism 18 is wide enough, an LBS system (or method) may direct baler 16 to weave between two (or more) paths of travel that are parallel to a centerline of a windrow, but also sufficiently offset from the centerline such that there is little to no overlap of material flow into the bale between the two paths of travel. This may further contribute to appropriately uniform bale formation.

It will be understood, with respect to the examples herein, that information from bale-shape sensors may not always be required for an LBG system (or method) to identify a bale size (or shape) and appropriately adjust an orientation of baler 16 (or another device). For example, based upon a known windrow width (e.g., as determined based upon the type of crop being cut and the type of machine used for the cutting) and the orientation of both baler 16 and a windrow being gathered (e.g., as determined based upon GPS location information), an LBG system (or method) may infer that an uneven bale is being formed. For example, if a baler is currently following the centerline of a windrow (e.g., as directed by an LBG system) and the windrow is substantially narrower than pick-up mechanism 18 (or a baling chamber in baler 16), an LBG system (or method) may determine that the bale being formed is likely to be barrel shaped and may adjust the path of travel of the baler accordingly. Similar determinations may also be performed with respect to other gathering operations and bale sizes (or shapes). For example, if an LBG system (or method) has been directing a baler for some time along a path that is offset to the right from the centerline of a windrow, the LBG system (or method) may determine that the bale being formed may be larger on the left side than on the right. Accordingly, the LBG system (or method) may direct a re-orientation of the baler, at least for a time, to a path that is offset to the left from the windrow centerline.

Continuing, in certain instances a windrow may not be oriented in a fully straight path along a field. An LBG system (or method) may also account for such a meandering orientation in its control of the orientation of pick-up mechanism 18 (e.g., as effected via control of a path of travel of vehicle 10 (or baler 16)). Referring to FIG. 5, for example, windrow 56 may be approximately the width of a bale to be formed by baler 16, but may have centerline 58 that deviates from a straight line over various sections of windrow 56 (i.e., may have a centerline that meanders over the field). As also discussed above, the orientation of windrow 56 (e.g., the varying orientation of centerline 58) may be determined based upon historical GPS (or other location) information that was gathered during a cutting or raking operation that formed windrow 56. With respect to windrow 56, in order to facilitate appropriate formation of a bale, an LBG system (or method) may direct vehicle 10 (and baler 16) to follow path of travel 60 that tracks, at least in part, the determined meandering profile of windrow centerline 58.

In light of the discussion herein, it will be understood that an LBG system (or method) may control baler 16 (including various components thereof), vehicle 10, both baler 16 and vehicle 10, or various other mechanisms or components. For example, in certain configurations baler 16 may be towed by vehicle 10 and may include only a single fixed axle. Accordingly, it may not be feasible to control the orientation of baler 16 directly (i.e., because the fixed axle may not be directly steerable). An LBG system (or method), therefore, may instead control the orientation of baler 16 (and thereby the orientation of pick-up mechanism 18 with respect to a relevant windrow) by controlling the direction of travel of vehicle 10. In such a case, for example, with baler 16 trailing behind vehicle 10, the real-time (and projected) location of baler 16 (along with intake mechanism 18) with respect to vehicle 10 may be determined based upon the determined location of vehicle 10 and relevant dimensions of the towing connection between vehicle 10 and baler 16 (e.g., connection 20), as well as various known aspects of the behavior of passively towed carriages (e.g., the angle formed between a trailer and a towing vehicle when the vehicle weaves to the side from an original path of travel). Alternatively, the orientation of baler 16 may be determined based upon a location-tracking device (not shown) that is included on baler 16 and which may accordingly directly provide orientation information for baler 16. Such a configuration may be useful even if an LBG system (or method) directly controls the orientation of vehicle 10 rather than baler 16 (although other configurations may be possible).

In certain configurations, baler 16 may additionally (or alternatively) include a steerable axle. Accordingly, an LBG system (or method) may control the orientation of baler 16 by directly controlling the direction of travel of baler 16 (independently of or along with similar control of vehicle 10). Similarly, in certain configurations, baler 16 may include various other controllable components. For example, as part of a control strategy for a baling operation an LBG system (or method) may directly control the orientation of one or more components in pick-up mechanism 18. For example, an LBG system (or method) may directly cause portions or components of a pick-up mechanism 18 (e.g., an auger or various teeth within a pick-up header (not shown)) to be articulated to either side (or otherwise) in order to alter the relative location at which crop material from a windrow enters baler 16.

It will be understood that the discussion above explicitly presents only certain examples of control strategies that may be executed by an LBG system (or method) with respect to a material gathering (or other) operation. It will be understood, in light of the discussion herein, that other methods of control may be possible. For example, various of the control strategies noted above (e.g., tracking a windrow centerline; directing a vehicle to weave to either side of a windrow centerline based upon location or bale size (or shape) information; directing travel parallel to a windrow centerline but at an offset; directly adjusting the orientation of a baler or of baler components; and so on) may be executed in various combinations and with respect to various windrow and vehicle orientations. Further, other control strategies will be apparent for utilizing the various discussed input information to ensure appropriate material pick-up and bale formation.

Figure 6:
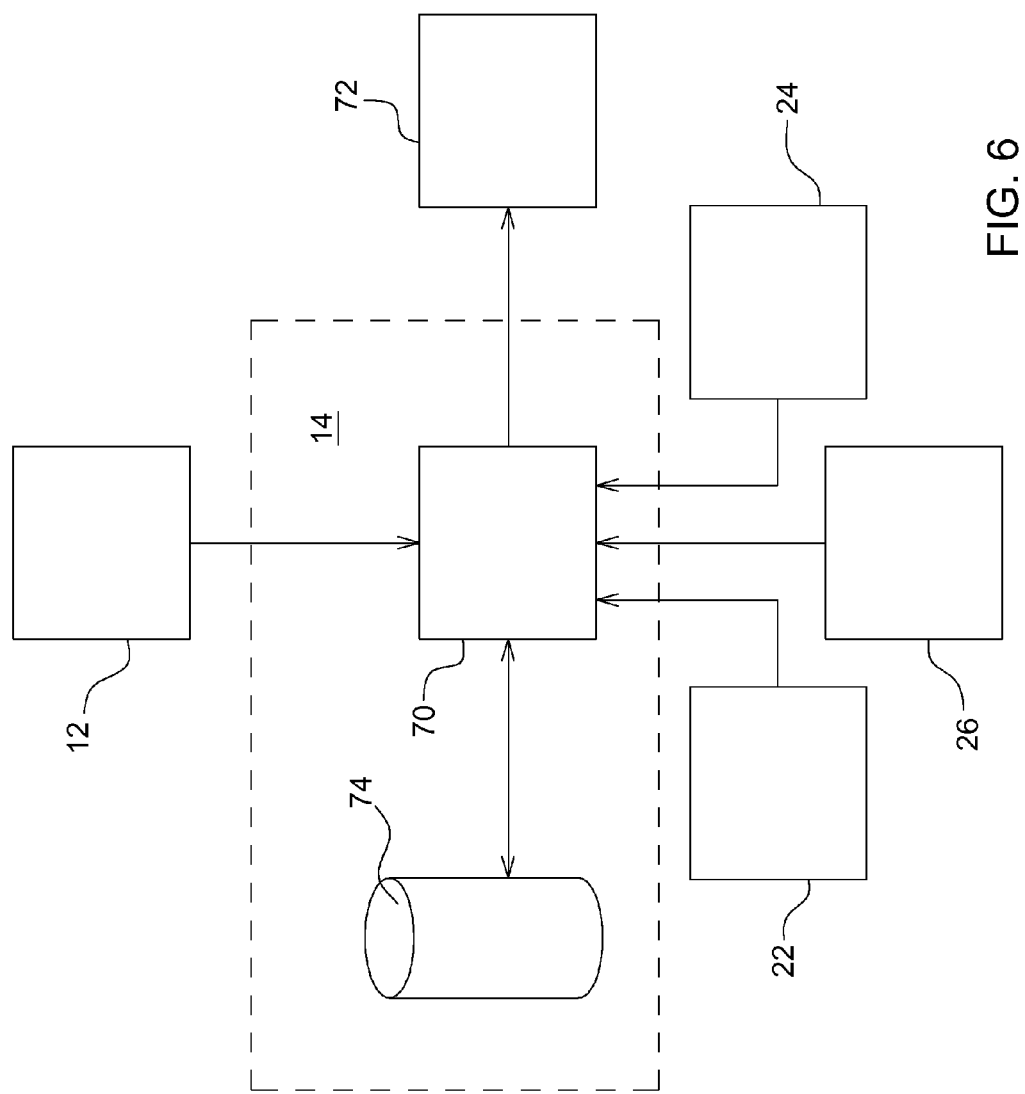
FIG. 6 is a schematic diagram of components of the control system of the work vehicle and baler of FIG. 1.

Referring also to FIG. 6, various components of an LBG system (or components that may execute an LBG method) are depicted. For example, baling control unit 14 (as part of an LBG system) may include controller 70, which may include one or more processors (not shown), one or more memory architectures (not shown), and one or more storage devices (e.g., storage device 74). In certain embodiments, various instructions (e.g., instructions for an LBG method) may be stored in storage device 74 for execution by processors included in controller 70. Likewise, other information (e.g., location data from a prior cutting or raking operation) may also be stored in storage device 74. Storage device 74 (or other storage devices associated with control unit 14) may include but is not limited to a hard disk drive, a solid-state drive, a tape drive, an optical drive, a RAID array, a random access memory ("RAM"), or a read-only memory ("ROM").

As also discussed above, an LBG system (or method) may utilize information from various sensors or other input devices. For example, control unit 14 may receive signals from location-tracking device 12 (e.g., a GPS device), left side bale-shape sensor 22, right side bale-shape sensor 24, central bale-shape sensor 26, or a variety of other devices such as wheel or other sensors (not shown) to indicate a direction in which the wheels of vehicle 10 (or baler 16) are turned, shaft sensors (not shown) to indicate vehicle speeds, and so on. Control unit 14 may utilize the various received information in order to determine an orientation of a relevant windrow (e.g., the contours of a centerline of the windrow), and an orientation of vehicle 10 (or baler 16) relative to the windrow (e.g., a current location and projected path of travel).

In certain embodiments, location information relating to a windrow may be received at control unit 14 from location-tracking device 12. For example, a GPS unit included in device 12 may store GPS information from a prior cutting or raking operation that also utilized vehicle 10, the location information indicating (or allowing determination of) the contours of the centerlines of various windrows in a field. This location information (or derivatives thereof) may then be transmitted to control unit 14 to facilitate control of the current material-gathering operation. Accordingly, in certain embodiments, historical (i.e., previously measured or derived) location information for various windrows as well as current location information for vehicle 10 (and baler 16) may be received at control unit 14 from location-tracking device 12.

In certain embodiments, location information relating to a windrow may be received at control unit 14 from a location-tracking device other than device 12. For example, GPS information from a prior cutting or raking operation with a vehicle other than vehicle 10 may be transmitted to and stored in storage device 74 for later retrieval by controller 70. For example, a wireless communication link (not shown) between vehicle 10 and a cutting or raking vehicle may allow location information (e.g., historical location information for various windrows) to be transmitted from a GPS device on the cutting or raking vehicle to storage device 74 on vehicle 10. Accordingly, in certain embodiments, historical location information for various windrows may be received at controller 70 from storage device 74, whereas current location information for vehicle 10 (and baler 16) may be received at controller 70 from location-tracking device 12. It will be understood that other configurations may also be possible.

Having determined an appropriate control strategy for a material-gathering operation (e.g., a control strategy for baling determined based upon current bale size (or shape), current baler location and direction of travel, and windrow location and size), control unit 14 may output various related commands to actuators 72 (or various other devices), which may be configured to change the orientation of vehicle 10, baler 16, pick-up mechanism 18, or other relevant mechanisms. In this way, for example, controller 70 may determine an appropriate path of travel for vehicle 10 (or baler 16) relative to a windrow (e.g., a path including various periods of straight travel interspersed with periods of weaving) and may utilize actuators 72 to direct vehicle 10 (or baler 16) along that path. For example, actuators 72 may be configured to control the speed of an engine of vehicle 10 (or baler 16), to turn the wheels of vehicle 10 (or baler 16) in order to change its direction of travel, or to control various other aspects of a baling (or other) operation.

In certain embodiments, control unit 70 may not directly cause an adjustment to the path of travel of a vehicle (or baler), including through commands to actuators 72 (or other devices). In certain embodiments, control unit 70 may provide a prompt to an operator of vehicle 10 that directs the operator to take a particular action, with the operator deciding whether to actually execute the action. For example, based upon determining an orientation of a windrow and of pickup mechanism 18, control unit 70 may cause a display screen in the cab of vehicle 10 to direct an operator to weave vehicle 10 to the right, and then similarly direct the operator to return to parallel (e.g., straight) travel along a windrow centerline once a desired offset from the centerline has been achieved.

Various means of determining appropriate control strategies and signals may be utilized by the architecture presented in FIG. 4 (or various other control architectures). In certain embodiments, a ratio of the signals from bale-shape sensors 22 and 24, or a difference between those signals, may be utilized to determine whether a bale is being unevenly formed, whether a weaving (or other) operation may be required and, in certain embodiments, the nature or degree of the weaving (or other) operation. For example, if a baler is being directed to generally follow a windrow centerline (e.g., within a particular offset to either side of the centerline), control unit 14 may directly convert changes in the ratio of measured right-side and left-side bale sizes to changes in the directed path of the baler relative to the windrow centerline.

Figure 7:
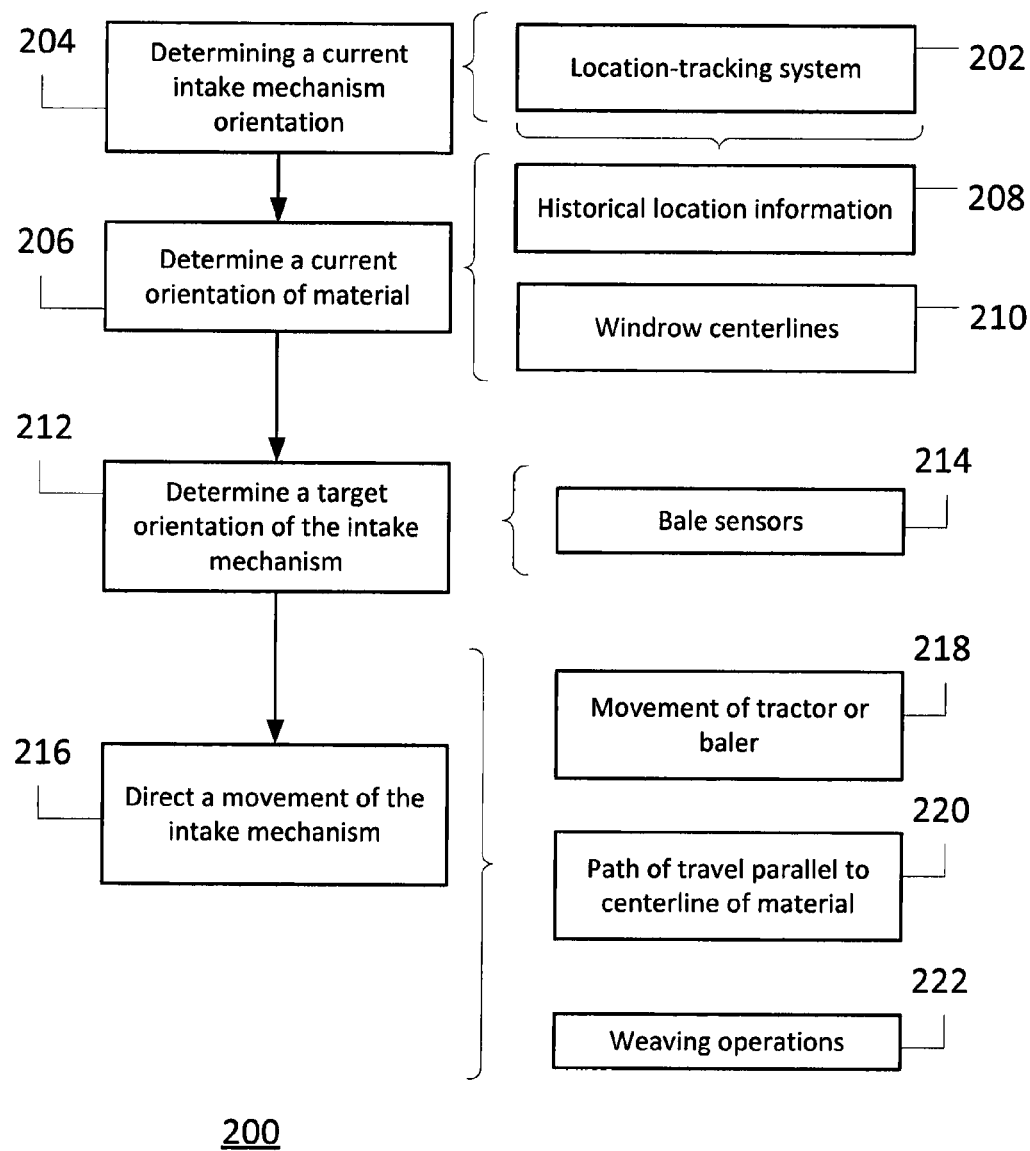
FIG. 7 is a process diagram showing operations of a control system and method for controlling baling operations for the work vehicle and baler of FIG. 1.

Referring also to FIG. 7, various operations of an example method (e.g., LBG method 200) or a control system implementing such a method are presented. As will be apparent from the discussion herein, LBG method 200 may be implemented with respect to one or more vehicles having among them an intake mechanism for cut or raked material and a location-tracking system (e.g., tracking system 202) for determining location information. For example, LBG method 200 may be implemented with respect to a tractor towing a baler, where either the baler or the tractor (or both) includes a GPS device capable of determining the location of the baler or the tractor. In such an embodiment, the baler may include an intake mechanism, the location of which may be relatively fixed (or determinately movable) with respect to the baler. As such, location information from the GPS device for the baler (or tractor) may be utilized to derive the location of the intake mechanism as well.

It will be understood that various other location-tracking systems 202 may be utilized. In certain implementations, a GPS device may receive signals from both a GPS satellite and a ground-based signal beacon, which may allow for more precise identification of vehicle orientation than if signals from only a satellite (or only the ground-based beacon) were received. In certain implementations, one or more vision-based tracking systems may be employed. Likewise, one or more real-time landmark trackers may be employed. A real-time landmark tracker, for example, may include a system for identifying one or more landmarks around a field (e.g., hills, silos, rocks, poles, and so on that are visible from the field) and identifying the locations of those landmarks with respect to a vehicle as the vehicle moves about the field. By triangulating the location of the identified landmarks, a relative location of the vehicle in the field may then be determined. This location information may also be utilized by an LBG system or method (e.g., method 200).

LBG method 200 may include determining 204 a current orientation of an intake mechanism. As noted above, as used herein "orientation" may refer to the location of an object, the direction an object is facing, various profiles or contours defined by an object's location, geometry or travel path, or a projected direction of travel of an object. As such, for example, LBG method 200 may utilize location information from location tracking system 202 to determine 204 the direction(s) in which a tractor, baler and baler intake mechanism are facing, the projected direction(s) of travel of the tractor, baler and baler intake, and so on. In certain embodiments, the orientation of an intake mechanism (e.g., a baler intake mechanism) may be indirectly derived (i.e., determined 204 indirectly) based upon a determined 204 location of an associated tractor or baler (e.g., based upon GPS measurements) and known spatial relationships between the intake mechanism and the tractor or baler (e.g., as determined based upon known geometry of the mounting of an intake mechanism to the tractor or baler, or known geometry of a trailer connection between the tractor and the baler).

LBG method 200 may further include determining 206 a current orientation of material to be gathered. For example, as also discussed above, a prior cutting or raking operation may have left an amount of cut crop material in a field. During the prior operation, historical location information 208 (e.g., information from location tracking system 202 regarding various locations of the cutting or raking equipment) may have been recorded. This recorded historical location information 208 (or information derived therefrom) may allow later determination (e.g., by LBG method 200) of the various locations of the cut material about the field. For example, it may be possible to determine the location and configuration of various windrows of the cut or raked material (e.g., the orientation of centerlines 210 of the windrows), based on the path of raking or cutting equipment (i.e., the successive locations of the equipment) during the prior operation. Therefore, based on historical location information 208, LBG method 200 may determine 206 the current orientation of the cut material including, for example, the location and contours of various centerlines 210 of material windrows.

LBG method 200 may then determine 212 a target orientation of the intake mechanism based upon, for example, the determined 204 current orientation of the intake mechanism and the determined 206 current orientation of the material. For example, the current orientation of the intake mechanism (e.g., a projected direction of travel of the mechanism) with respect to the current orientation of the material (e.g., a contoured centerline 210 of a windrow) may not be optimal for material pickup (or related operations, such as baling). Accordingly, a different target orientation for the intake mechanism (e.g., a different position or projected direction of travel) may be determined 212 in order to effect better material pickup (or baling, and so on). For example, LBG 200 may determine 212 a particular direction of travel (or other orientation) for the intake mechanism to ensure appropriate material gathering based on inputs from bale sensors 22, 24, 26, as discussed above with respect to FIGS. 2-5.

After determining 212 a target orientation, LBG method 200 may subsequently direct 216 a movement of the intake mechanism toward the determined 212 target orientation. This directing 216 of movement may include various operations directed toward various portions of a material gathering (e.g., baling) system. For example, in certain embodiments LBG method 200 may direct 216 a movement of an intake mechanism indirectly, by directing a movement 218 (i.e., directing a re-orientation) of a baler to which the mechanism is attached, or a vehicle that is towing such a baler. Alternatively (or additionally), LBG method 200 may direct 216 a movement of the intake mechanism directly. For example, if various parts of an intake mechanism may be moved from side to side (or otherwise) with respect to a vehicle (e.g., a baler) that supports the intake mechanism, LBG method 200 may direct movement of those parts to a new orientation (e.g., to a side closer to a targeted material windrow).

Continuing, a directed 216 movement of the intake mechanism may include various types of directed movements. In certain embodiments, LBG method 200 may direct 216 a vehicle (or other machine) to follow path of travel 220 parallel to a centerline of the material to be gathered. For example, LBG method 200 may direct 216 a tractor towing a baler to generally follow path of travel 220 that is locally parallel to a centerline of a target windrow. In certain embodiments, LBG method 20 may direct 216 a vehicle (or other machine) to execute various weaving operations 222. For example, in addition to directing 216 a tractor along various paths of travel 220 that are parallel to a windrow centerline, LBG method 200 may direct 216 the tractor to execute various intermittent weaving operations that carry the tractor away from a current path of travel 220. Various other examples are also discussed throughout this disclosure or will be understood in light of this disclosure.

As will be appreciated by one skilled in the art, the disclosed subject matter may be embodied as a method, system, (e.g., a vehicle control system included in work vehicle 10) or computer program product. Accordingly, certain implementations may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

In certain implementations, an LBG method (or system of computer program product) may be a stand-alone process (or system or product). In certain implementations, an LBG method (or system of computer program product) may operate as part of, or in conjunction with, one or more other processes (or systems or products) and/or may include one or more other processes (or systems or products).

Aspects of certain embodiments are described herein with reference to flowchart illustrations and/or block diagrams of methods, apparatus (systems) and computer program products according to embodiments of the invention. These flowcharts and block diagrams illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It will be understood that each block of any flowchart illustrations and/or block diagrams, and combinations of blocks in the flowchart illustrations and/or block diagrams, can be implemented by computer program instructions, by special purpose hardware-based systems that perform the specified functions or acts, or combinations of special purpose hardware and computer instructions.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A computer-implemented method for gathering material with one or more vehicles including a baler having an intake mechanism for the material and a location-tracking system capable of determining location information for the one or more vehicles, the method comprising:
   determining, by one or more computing devices, a current orientation of the intake mechanism of the baler, the intake mechanism being part of the baler, based upon, at least in part, location information determined by the location-tracking system;
   determining, by the one or more computing devices, a current orientation of the material based upon, at least in part, historical location information for the material;
   determining, by the one or more computing devices, a target orientation of the intake mechanism based upon, at least in part, the determined current orientation of the material, the target orientation of the intake mechanism being located towards one side of the baler; and
   directing, by the one or more computing devices, a movement of the intake mechanism from the determined current orientation of the intake mechanism toward the determined target orientation by moving the intake mechanism towards the one side of the baler relative to the baler.

2. The computer-implemented method of claim 1, wherein the one or more vehicles include a tractor; and
   wherein directing the movement of the intake mechanism of the baler is based upon directing a movement of one or more of the tractor and the baler.

3. The computer-implemented method of claim 1, wherein the location-tracking system includes a global positioning system device.

4. The computer-implemented method of claim 3, wherein the historical location information for the material is determined, at least in part, based upon information from the global positioning system device.

5. The computer-implemented method of claim 1, wherein the location-tracking system includes a real-time landmark tracker.

6. The computer-implemented method of claim 1, wherein the material is formed into one or more windrows;
   wherein determining the current orientation of the material includes determining a current orientation of the one or more windrows;
   wherein determining the current orientation of the one or more windrows includes, at least in part, identifying one or more windrow centerlines; and
   wherein directing the movement of the intake mechanism includes directing movement of the intake mechanism along one or more paths of travel that are locally parallel and offset with the one or more windrow centerlines.

7. The computer-implemented method of claim 1, wherein the material is formed into one or more windrows;
   wherein determining the current orientation of the material includes determining a current orientation of the one or more windrows;
   wherein determining the current orientation of the one or more windrows includes, at least in part, identifying one or more windrow centerlines; and
   wherein directing the movement of the intake mechanism includes directing one or more weaving operations with respect to the one or more windrow centerlines.

8. The computer-implemented method of claim 1, wherein determining the target orientation of the intake mechanism is further based upon, at least in part, information from two or more bale-shape sensors within a baling chamber included in the one or more vehicles.

9. The computer-implemented method of claim 1, wherein the intake mechanism of the baler includes an auger such that the auger moves towards the one side of the baler relative to the baler.

10. The computer-implemented method of claim 1, wherein the intake mechanism of the baler includes teeth such that the teeth move towards the one side of the baler relative to the baler.

11. A system for gathering material, the system comprising:
   one or more vehicles including a baler having an intake mechanism for the material, the intake mechanism being part of the baler;
   a location-tracking system movable with the one or more vehicles and capable of determining location information for the one or more vehicles and the intake mechanism;
   one or more processor devices; and
   one or more memory architectures coupled with the one or more processor devices;
   wherein the one or more processor devices are configured to:
   determine a current orientation of the intake mechanism of the baler based upon, at least in part, location information determined by the location-tracking system;

determine a current orientation of the material, based upon, at least in part, historical location information for the material;

determine a target orientation of the intake mechanism based upon, at least in part, the determined current orientation of the material, the target orientation of the intake mechanism being located towards one side of the baler; and directing, by the one or more computing devices, a movement of the intake mechanism from the determined current orientation of the intake mechanism toward the determined target orientation by moving the intake mechanism towards the one side of the baler relative to the baler.

12. The system of claim 11, wherein the one or more vehicles include a tractor; and wherein directing the movement of the intake mechanism of the baler is based upon directing a movement of one or more of the tractor and the baler.

13. The system of claim 11, wherein the tracking system includes a global positioning system device.

14. The system of claim 13, wherein the historical location information for the material is determined, at least in part, based upon information from the global positioning system.

15. The system of claim 11, wherein the tracking system includes a real-time landmark tracker.

16. The system of claim 11, wherein the material is formed into one or more windrows;

wherein determining the current orientation of the material includes determining a current orientation of the one or more windrows;

wherein determining the current orientation of the one or more windrows includes, at least in part, identifying one or more windrow centerlines; and wherein directing the movement of the intake mechanism includes directing movement of the intake mechanism along one or more paths of travel that are locally parallel and offset with the one or more windrow centerlines.

17. The system of claim 11, wherein the material is formed into one or more windrows;

wherein determining the current orientation of the material includes determining a current orientation of the one or more windrows;

wherein determining the current orientation of the one or more windrows includes, at least in part, identifying one or more windrow centerlines; and wherein directing the movement of the intake mechanism includes directing one or more weaving operations with respect to the one or more windrow centerlines.

18. The system of claim 11, wherein determining the target orientation of the intake mechanism is based upon, at least in part, information from two or more bale-shape sensors within a baling chamber of a baler included in the one or more vehicles.

19. The system of claim 11, wherein the intake mechanism of the baler includes an auger such that the auger moves towards the one side of the baler relative to the baler.

20. The system of claim 11, wherein the intake mechanism of the baler includes teeth such that the teeth move towards the one side of the baler relative to the baler.

* * * * *